United States Patent
Lee

(10) Patent No.: US 8,730,385 B2
(45) Date of Patent: May 20, 2014

(54) METHOD OF ECONOMIZING POWER IN IMAGE PICKUP SYSTEM AND IMAGE PICKUP SYSTEM USING THE METHOD

(71) Applicant: Samsung Electronics Co., Ltd, Suwon-si (KR)

(72) Inventor: Kwang-Hee Lee, Anyang-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/709,166

(22) Filed: Dec. 10, 2012

(65) Prior Publication Data

US 2013/0100315 A1 Apr. 25, 2013

Related U.S. Application Data

(63) Continuation of application No. 12/626,211, filed on Nov. 25, 2009, now Pat. No. 8,350,956.

(30) Foreign Application Priority Data

Dec. 24, 2008 (KR) .......................... 10-2008-0133844

(51) Int. Cl.
*H04N 5/225* (2006.01)

(52) U.S. Cl.
USPC ............................................ 348/372; 348/362

(58) Field of Classification Search
USPC ................................. 348/222.1, 362, 367, 372
See application file for complete search history.

(56) References Cited

U.S. PATENT DOCUMENTS

2002/0085112 A1* 7/2002 Hiramatsu et al. ............ 348/362

FOREIGN PATENT DOCUMENTS

JP 2002300466 * 10/2002 ............. H04N 5/232

* cited by examiner

*Primary Examiner* — Gevell Selby
(74) *Attorney, Agent, or Firm* — F. Chau & Associates, LLC

(57) ABSTRACT

A method of operating an image pickup system includes generating a first control signal in response to a long duration exposure mode selectively input by a user, setting circuits to process image data associated with modes other than long duration exposure mode to a standby mode in response to the first control signal, generating a second control signal when the standby mode has been established, opening a shutter in response to the second control signal, and performing a long duration exposure to accumulate a charge corresponding to an optical signal incident on an image sensor of the image pickup system when the shutter is open.

20 Claims, 3 Drawing Sheets

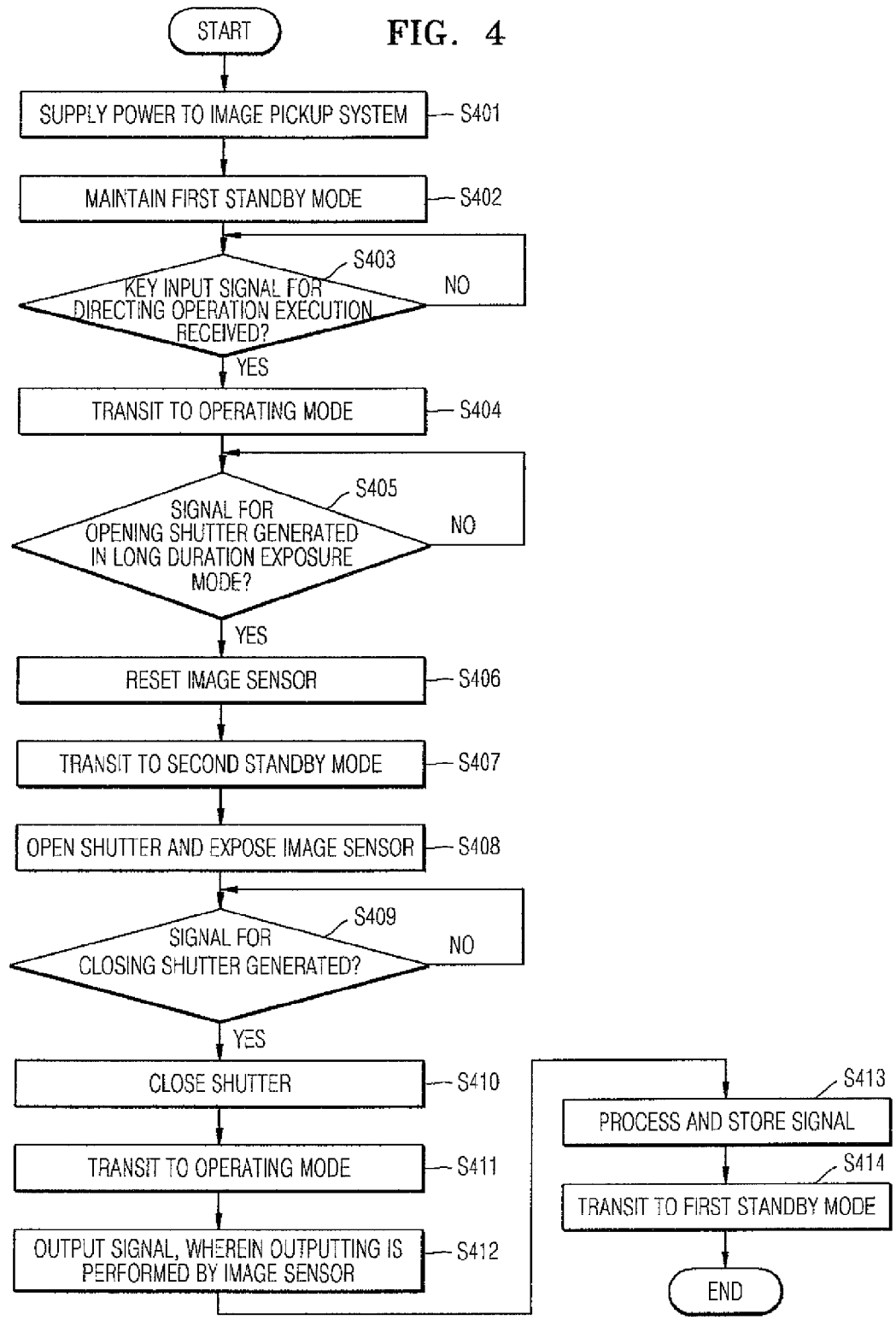

METHOD OF ECONOMIZING POWER IN IMAGE PICKUP SYSTEM AND IMAGE PICKUP SYSTEM USING THE METHOD

CROSS-REFERENCE TO RELATED APPLICATIONS

This application is a continuation application of co-pending U.S. application Ser. No. 12/626,211 filed Nov. 25, 2009, which claims priority to Korean Patent Application No. 10-2008-0133844, filed on Dec. 24, 2008, in the Korean Intellectual Property Office, the disclosures of which are each incorporated by reference in their entireties.

BACKGROUND

1. Technical Field

Embodiments of the present invention relate to an image pickup system and a method of operating the image pickup system, and more particularly, to an image pickup system and method of operating the system for use in a long duration exposure mode.

2. Discussion of Related Art

Image pickup systems can convert an optical signal into an electric signal, signal-process the electric signal, store data corresponding to the electric signal in a memory, and output the data stored in the memory to a display device by reading the data.

A digital camera is an example of an image pickup system, which may benefit from a reduction in size and weight. Further, since a digital camera is supplied with power via a battery, the length of time that the camera can be used can be extended when consumption power is decreased.

Thus, there is a need for an image pickup systems and methods of operating such that can reduce power consumption.

SUMMARY

An exemplary embodiment of the present invention includes a method of operating an image pickup system, The method includes: maintaining a circuit for accumulating an amount of charge corresponding to an optical signal incident on a pixel array of an image sensor, and a control circuit for receiving a key input signal generated by the image pickup system and generating a control signal corresponding to the key input signal, in an operating mode, and switching remaining circuit configuration means including at least a circuit for processing a signal output from the image sensor to a standby mode, during a period a shutter is open when a long duration exposure is performed; and switching the remaining circuit configuration means in the standby mode to an operating mode, when the shutter is closed after the period the shutter is open when the long duration exposure is performed.

Information about specifications set in the image pickup system may be stored in a storage means and then circuit configuration means unrelated to performing the long duration exposure may be switched to a standby mode, according to an open state of the shutter, when the long duration exposure is performed. Pixel arrays of the image sensor of the image pickup system may be reset before the shutter is opened. At least two portions of firmware for analyzing a switch input and firmware for controlling a standby mode in a controller of the image pickup system may maintain an operating mode, during the period the shutter is open when the long duration exposure is performed.

Current may be blocked from flowing through a column signal line connected to output terminal of the pixel array included in the image sensor during the period the shutter is open when the long duration exposure is performed.

An exemplary embodiment of the present invention includes a method of operating an image pickup system. The method includes generating, by a controller of the image pickup system, a first control signal in response to a long duration exposure mode selectively input by a user, wherein the image pickup system includes first circuits to process image data associated with the long duration exposure mode and second circuits to process image data associated with other modes, setting the second circuits to a standby mode in response to the first control signal, generating, by the controller, a second control signal when the standby mode has been established, opening a shutter of the image pickup system in response to the second control signal, and performing, by the image pickup system, a long duration exposure to accumulate a charge corresponding to an optical signal incident on an image sensor of the image pickup system when the shutter is open.

The method may further include generating, by the controller, a third control signal when a predefined period for performing the long duration exposure mode has elapsed, closing the shutter in response to the third control signal, generating, by the controller, a fourth control signal when the shutter is closed, and setting the second circuits to an operating mode in response to the fourth control signal. The setting of the second circuits to a standby mode may include powering down the second circuits.

An exemplary embodiment of the present invention includes an image pickup system. The system includes: an image sensor that detects an optical signal incident on the image sensor and converts the optical signal to an electric signal, a signal processor that generates image data by processing the electric signal output from the image sensor, a switch unit that selects a function and an execution mode of an image pickup system, and a controller that maintains a circuit for accumulating an amount of charge corresponding to an optical signal incident on a pixel array of the image sensor in an operating mode, and switches the signal processor to a standby mode, when a signal for opening a shutter is received from the switch unit when a long duration exposure is performed. The signal processor may process the electric signal according to set specifications.

The controller may store information about the specifications of the image pickup system set by the switch unit in a storage means, and then switch circuit configuration means unrelated to performing of the long duration exposure to a standby mode, when the signal for opening the shutter is received when the long duration exposure is performed. For example, the image pickup system may include first circuits to process image data associated with the long duration exposure mode and second circuits to process image data associated with the modes other than the long duration exposure mode, and the controller may be configured to switch the second circuits to the standby mode.

The controller may generate control signals having a logic value for blocking current flowing through a column signal line connected to an output terminal of the pixel array included in the image sensor, when the signal for opening the shutter is received from the switch unit when the long duration exposure is performed. The system may further include a transistor connected between an output terminal of each pixel and the signal processor, where a gate of the transistor is configured to receive a corresponding one of the control signals. The controller may reset pixel arrays of the image sensor and then opens the shutter, when the signal for opening the shutter is received.

The controller may maintain firmware for analyzing a signal received from the switch unit and firmware for controlling the standby mode in the operating mode, when the shutter is opened when the long duration exposure is performed.

An exemplary embodiment of the present invention includes a method of operating an image pickup system. The method includes supplying power to a controller and a switch unit of the image pickup system and blocking power to remaining circuits of the image pickup system, supplying power to an image sensor of the remaining circuits when the controller determines that a signal input from the switch unit corresponds to a long duration exposure mode selection, supplying an opening signal for opening a shutter of the image pickup system when power has been supplied to the image sensor, supplying power to circuits of the remaining circuits responsible for handling the long duration exposure mode and blocking power to other-mode circuits and signal processing circuits of the remaining circuits, and opening the shutter and using the image sensor to perform the long duration exposure. The other-mode circuits are responsible for handling modes other than the long duration exposure mode.

The opening of the shutter may be preceded by resetting pixels arrays of the image sensor. The method may include supplying a closing signal to the shutter to close the shutter when the long duration exposure has completed. The method may include supplying power to the signal processing circuit and processing a signal output generated by the image sensor by the signal processing circuit. The method may include supplying power to the other-mode circuits when power is supplied to the signal processing circuit. The method may include storing the processed signal in a storage unit of the remaining circuits. The method may then block power to all the remaining circuits when the signal has been processed and/or stored.

BRIEF DESCRIPTION OF THE DRAWINGS

Exemplary embodiments of the present invention will be more clearly understood from the following detailed description taken in conjunction with the accompanying drawings in which:

FIG. 4 is a flowchart illustrating a method of operating an image pickup system, according to an exemplary embodiment of the present invention.

DETAILED DESCRIPTION OF EXEMPLARY EMBODIMENTS

Hereinafter, the present invention will be described in detail by explaining exemplary embodiments thereof with reference to the attached drawings.

Figure 1:
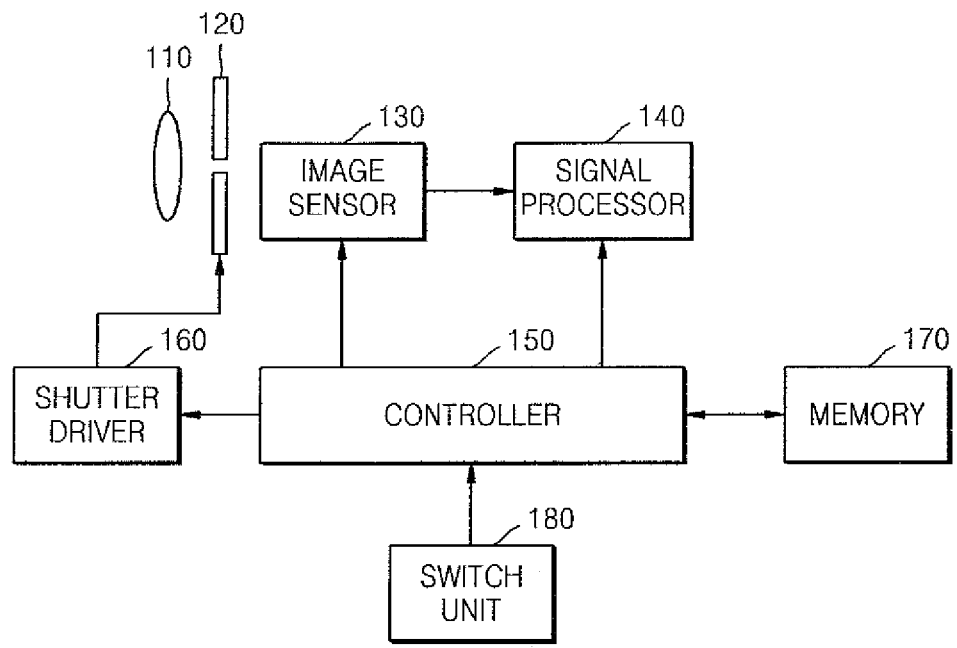
FIG. 1 is a block diagram of an image pickup system according to an exemplary embodiment of the present invention.

FIG. 1 is a block diagram of an image pickup system according to an exemplary embodiment of the present invention. Referring to FIG. 1, the image pickup system includes a lens 110, a shutter 120, an image sensor 130, a signal processor 140, a controller 150, a shutter driver 160, a memory 170, and a switch unit 180.

The lens 110 collects light incident on the lens 110 and the shutter 120 passes or blocks the collected light. An optical filter, a prism, or various other optical means may be disposed between the lens 110 and the shutter 120 of the image pickup system, but descriptions thereof are omitted since they are not needed to aid in understanding the invention.

The image sensor 130 includes a pixel unit that generates an electric signal corresponding to the intensity of light received from the lens 110 while the shutter 120 is open. The signal processor 140 converts an analog signal output from the image sensor 130 to a digital signal and then signal-processes the digital signal. The signal processor 140 may signal-process the digital signal according to specifications, for example, a resolution specification, set in the image pickup system. The digital signal processed by the signal processor 140 may be stored in the memory 170.

The switch unit 180 may include a plurality of keys for selecting a function and an execution mode of the image pickup system, and a circuit for detecting a key input and generating a key input signal corresponding to the key input. The switch unit 180 and the controller 150 are electrically connected to each other, and thus the key input signal generated by the switch unit 180 may be transmitted to the controller 150. The shutter driver 160 controls the shutter 120 to be opened or closed according to a control signal generated by the controller 150.

The controller 150 is electrically connected to the image sensor 130, the signal processor 140, the memory 170, the shutter driver 160, and the switch unit 180. The controller 150 analyzes the key input signal received from the switch unit 180, and generates control signals for operating a mode corresponding to the key input signal.

When the controller 150 receives a key input signal for opening a shutter from the switch unit 180 when a long duration exposure mode (also referred to as a bulb exposure mode) is selected, the controller 150 may maintain only circuit configuration means required to perform long duration exposure from among all circuit configuration means included in the image pickup system in an operating mode, and switch remaining circuit configuration means to a standby mode.

For reference, exposure time is a relatively short duration during a general image pickup mode. However, when the long duration exposure mode is selected, exposure time may be at least 30 seconds. For example, the image pickup system may be designed in such a way that the shutter 120 is open while a shutter key disposed on the switch unit 180 is pressed when the long duration exposure mode is selected.

The controller 150 may operate as follows when the key input signal for opening the shutter 120 is received when the long duration exposure mode is selected. The controller 150 may store information about the specifications set on the image pickup system set by the switch unit 180 in a storage means (not shown). The storage means may be registers disposed inside the controller 150, or may be the memory 170.

The controller 150 may generate a control signal for resetting the pixel array included in the image sensor 130, and then generate a control signal for opening the shutter 120. The controller 150 also maintains a circuit for accumulating an amount of charge corresponding to an optical signal incident on the pixel array of the image sensor 130 in an operating mode, and switches the signal processor 140 to a standby mode. In standby mode, power is not supplied to the signal processor 140, thereby switching the signal processor 140 to an inactivated state.

The controller 150 generates a control signal for blocking current from flowing through a plurality of column signal lines, each connected to a corresponding output terminal of the pixel array included in the image sensor 130. Accordingly, power consumed by the image sensor 130 may be minimized.

Then, the controller 150 switches the circuit configuration means in the standby mode to an operating mode, when the controller 150 receives a key input signal for closing the shutter 120 to complete the long duration exposure.

Figure 2:
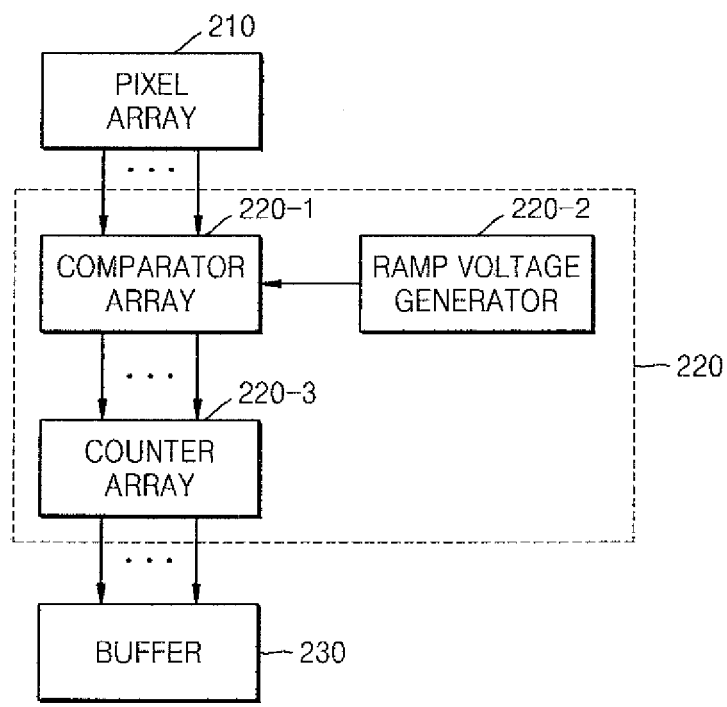
FIG. 2 is a block diagram of an image sensor included in the image pickup system of FIG. 1 according to an exemplary embodiment of the present invention.

Operations that may reduce power used by the image sensor 130 during a period the shutter 120 is open when the long duration exposure mode is selected will now be described with reference to FIGS. 2 and 3. FIG. 2 is a block diagram of the image sensor 130 included in the image pickup system of FIG. 1 according to an exemplary embodiment of the present invention. Referring to FIG. 2, the image sensor 130 includes a pixel array 210, an analog/digital (A/D) converter 220, and a buffer 230. The pixel array 210 may also be referred to as a pixel sensor array. The A/D converter 220 includes a comparator array 220-1, a ramp voltage generator 220-2, and a counter array 220-3.

In an alternate embodiment, the pixel array 210 is disposed in the image sensor 130, and the A/D converter 220 is disposed in the signal processor 140. Alternatively, the pixel array 210 and the comparator array 220-1 included in the A/D converter 220 may be disposed in the image sensor 130, and the ramp voltage generator 220-2 and the counter array 220-3 may be disposed in the signal processor 140.

The pixel array 210 transmits an analog signal generated based on amounts of charge accumulated in a photoelectric transformation device included in a pixel of the pixel array 210 in response to control signals generated by the controller 150, to the comparator array 220-1 via a column signal line. The comparator array 220-1 compares the analog signal detected by the pixel array 210 with a ramp signal generated by the ramp voltage generator 220-2, and generates an output signal corresponding to a difference between the detected signal and the ramp signal. The ramp voltage generator 220-2 may generate a ramp voltage at a time when the comparator array 220-1 starts to operate.

The counter array 220-3 performs counting according to the signal output from the comparator array 220-1. For example, the counter array 220-3 is enabled at a time when the signal output from the comparator array 220-1 transits from a first logic value to a second logic value, and stops counting at a time when the signal output from the comparator array 220-1 transits from the second logic value to the first logic value.

For example, the counter array 220-3 can start counting at a time corresponding to generation of the ramp signal, and stop counting when an output signal having a first logic value that is generated at a time when the ramp voltage decreases below the voltage of the signal generated by the pixel array 210, is generated. Values counted by the counter array 220-3 may be temporarily stored in the buffer 230.

Referring back to FIG. 1, the controller 150 reads the values stored in the buffer 230, and generates digital data corresponding to an optical image detected in a pixel. The controller 150 blocks power to the A/D converter 220 and the buffer 230, thereby switching the A/D converter 220 and the buffer 230 to a standby mode, thereby reducing power consumption during the period the shutter 120 is open when the long duration exposure mode is selected.

The controller 150 supplies power to the A/D converter 220 and the buffer 230, thereby switching the A/D converter 220 and the buffer 230 to an operating mode, when the period the shutter 120 is open has completed (e.g., when the shutter 120 is closed, when the long duration exposure mode is selected).

Operations of reducing power used by a pixel structure of the pixel array 210 will now be described with reference to FIG. 2 and FIG. 3. FIG. 3 illustrates a pixel array circuit diagram of two unit pixels P1 and P2 of pixel array 210 of FIG. 2. Referring to FIG. 3, unit pixels P1 and P2 each include respective photodiodes PD1 and PD2, respective floating diffusion nodes FD1 and FD2, 4 respective transistors (MN1-MN4) and (MN6, MN7, MN8, and MN9), and respective column units CL(1) and CL(2). Each of the column units CL(1) and CL(2) include a portion of a respective pixel unit, respective current sources Ib1 and Ib2, and respective transistors MN5 and MN10.

Power source VDDpix is supplied to the unit pixels P1 and P2 comprising the pixel array 210. The power source VDDpix is normally supplied to the unit pixels P1 and P2 even in the period the shutter 120 is open when the long duration exposure mode is selected.

An operation performed on the unit pixel P1 will now be described with reference to FIG. 3. From among the 4 NMOS transistors, a transistor MN1 discharges a charge stored in a floating diffusion node FD1 by resetting the voltage of the floating diffusion node FD1 to the level of the power source VDDpix, and a transistor MN2 transmits a charge accumulated in a photodiode PD1 to the floating diffusion node FD1. A transistor MN3 operates as a source follow, and a transistor MN4 operates as a switch for switching and addressing, and transmits a pixel signal to a column signal line CL1.

The transistor MN3, the transistor MN4, and the current source Ib1 form a source follow. A transistor MN5 is turned off in a standby mode by a control signal CTL_STB generated by the controller 150, and is turned on in an operating mode.

Accordingly, the transistor MN5 is turned off in the standby mode during the period the shutter 120 is open when the long duration exposure mode is selected, and thus a current I2 flowing through the column signal line CL1 may be 0 amps (A) or substantially 0 A. For example, the current I2 is blocked from flowing through the column signal line CL1 regardless of a logic state of a control signal SEL for selecting row cells when the transistor MN5 is turned off.

Figure 3:
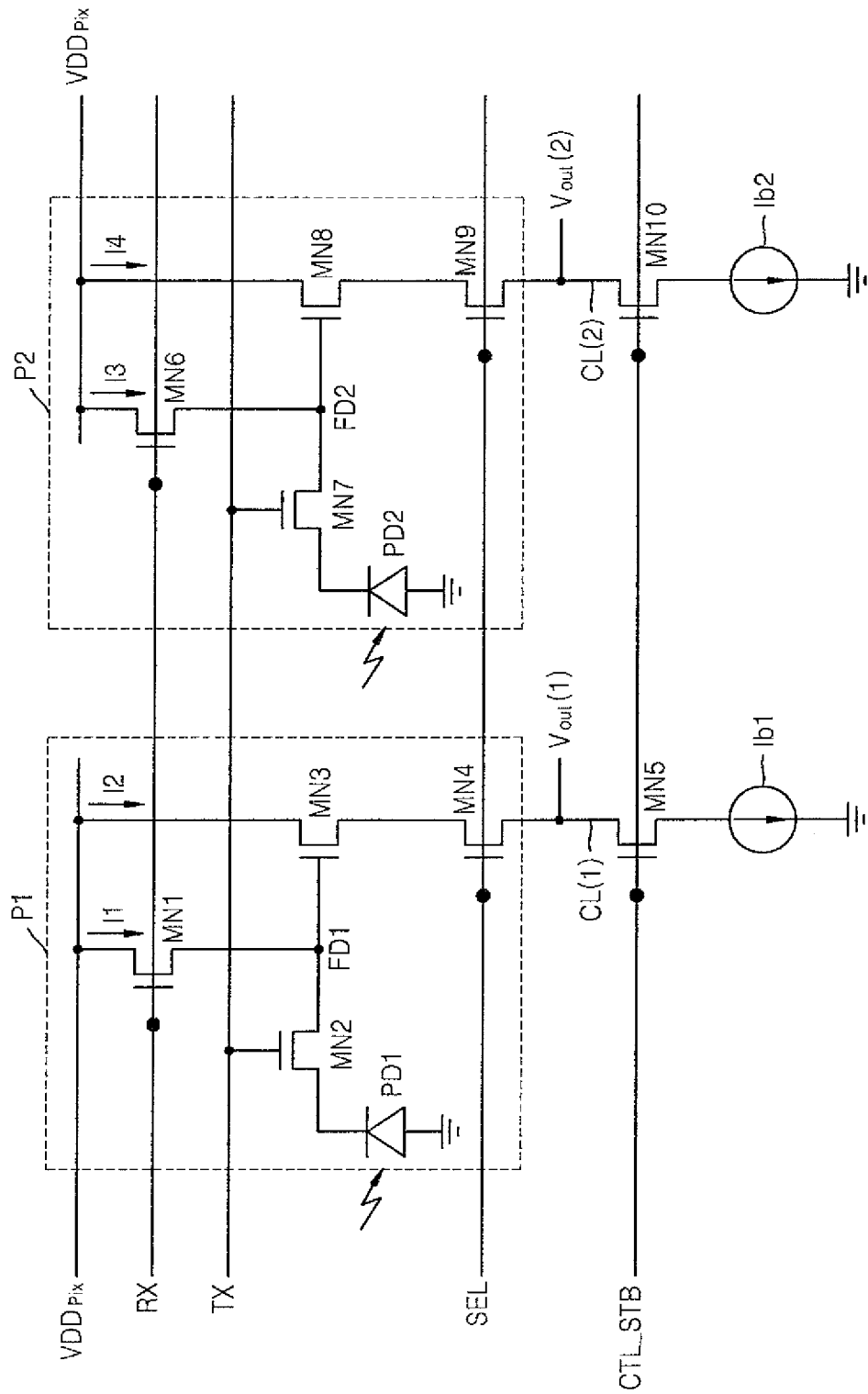
FIG. 3 is a circuit diagram of a pixel array included in the image sensor of FIG. 2 according to an exemplary embodiment of the present invention.

Referring to FIG. 1 and FIG. 3, the controller 150 generates a control signal RX in a logic state "high" and a control signal TX in a logic state "low" in a standby mode during the period the shutter 120 is open when the long duration exposure mode is selected.

Accordingly, the transistor MN1 is turned on and the transistor MN2 is turned off. When a voltage of the floating diffusion node FD1 reaches the voltage level of the power supply source VDDpix as the transistor MN1 is turned on, a current I1 flowing through the transistor MN1 may reach 0 A or substantially 0 A.

When the transistor MN2 is turned off, a charge corresponding to the intensity of light incident on the photodiode PD1 is accumulated in the photodiode PD1. Power consumption may be minimized by blocking the currents I1 and I2 flowing through the unit pixel P1 in a standby mode during the period the shutter 120 is open when the long duration exposure is performed.

Then, when the shutter 120 is closed, since the period the shutter 120 is open has completed when the long duration exposure is performed, the unit pixel P1 is switched to an operating mode. During the operating mode, a logic state of the control signal CTL_STB is converted to "high", thereby turning on the transistor MN5. The logic state of the control signal RX is also converted to "low", and the logic state of the control signal TX is converted to "high". Accordingly, the transistor MN2 is turned on, and thus the charge accumulated in the photodiode PD1 is transmitted to the floating diffusion node FD1.

When corresponding row pixels are selected by the control signal SEL, a voltage corresponding to the voltage level of the floating diffusion node FD1 of the selected row pixels is output to an output terminal Vout(1) of the column signal line CL(1). A signal of the output terminal Vout(1) is transmitted to the A/D converter 220 of FIG. 2, and converted to digital data.

An operation performed on the unit pixel P2 may be identical to the operation performed on the unit pixel P1. For example, power consumption may be minimized by blocking the currents I3 and I4 flowing through the unit pixel P2 in a standby mode during the period the shutter 120 is open when the long duration exposure is performed. Further, when corresponding row pixels are selected by the control signal SEL, a voltage corresponding to the voltage level of the floating diffusion node FD2 of the selected row pixels is output to an output terminal Vout(2) of the column signal line CL(2)

As described above, power consumption in the image sensor 130 may be minimized by blocking current from flowing through a column signal line of a pixel array in a standby mode during the period the shutter 120 is open when the long duration exposure is performed.

FIG. 4 is a flowchart illustrating a method of operating an image pickup system, according to an exemplary embodiment of the present invention. The method will now be described with reference to FIGS. 1 through 4.

In operation S401, when a power on key of the switch unit 180 is activated so as to power on the image pickup system, the controller 150 supplies power generated in a power supplier (e.g., using a battery not shown) to the image pickup system.

In operation S402, while power is being supplied to the image pickup system, the controller 150 maintains the image pickup system in a first standby mode to minimize power consumption. In the first standby mode, power is supplied only to the controller 150 and the switch unit 180, and is blocked from remaining circuit configuration means. Alternatively, only firmware for receiving and analyzing a key input signal from the switch unit 180 and firmware for controlling a standby mode in the controller 150 may be activated, and remaining pieces of firmware in the controller 150 may be inactivated, so as to minimize power consumption.

In operation S403, it is determined whether the controller 150 received a key input signal for starting operation execution from the switch unit 180.

In operation S404, when it is determined that the controller 150 received the key input signal for starting operation execution in operation S403, the controller 150 transits the image pickup system to an operating mode. When the image pickup system is transited to the operating mode, power is supplied to all circuit configuration means of the image pickup system, and thus a control operation and signal process corresponding to the key input signal is executed normally.

In operation S405, after the image pickup system is transited to the operating mode, in response to the key input signal, the controller 150 determines whether a signal for opening the shutter 120 is generated in a long duration exposure mode.

In operation S406, when it is determined that the signal for opening the shutter 120 is generated in the long duration exposure mode in operation S405, the controller 150 resets pixel arrays of the image sensor 130, and stores information about specifications set in the image pickup system in a storage means. For example, the controller 150 generates control signals for discharging charges accumulated in photodiodes of pixel arrays of the image sensor 130. Referring to FIG. 3, the logic states of the control signals TX and RX are "high" in the current operation, and thus charges accumulated in the photodiodes PD1 and PD2 are discharged.

In operation S407, the controller 150 transits the image pickup system to a second standby mode. In the second standby mode, circuit configuration means required to execute the long duration exposure from among all circuit configuration means included in the image pickup system is maintained to be in an operating mode (e.g., an activated state), and remaining circuit configuration means are switched to a standby mode (e.g., an inactivated state). In the second standby mode, a circuit for accumulating an amount of charge corresponding to light incident on the pixel array of the image sensor 130 is activated, and the signal processor 140 is inactivated by blocking power to the signal processor 140. The controller 150 also blocks current flowing through the column signal line connected to the output terminal of the pixel array included in the image sensor 130. Referring to FIG. 3, the logic state of the control signal TX is "low", the logic state of the control signal RX is "high", and the logic state of the control signal CTL_STB is "low" in the second standby mode.

In operation S408, after transiting the image pickup system to the second standby mode in operation S407, the controller 150 generates a control signal for opening the shutter 120, thereby exposing the image sensor 130. During the period the shutter 120 is open, a charge corresponding to the intensity of the light incident on photodiodes is accumulated in the photodiodes of the pixel array of the image sensor 130.

In operation S409, the controller 150 determines whether a signal for closing the shutter 120 so as to complete the long duration exposure is generated according to a key input signal generated by the switch unit 180. In operation S410, when it is determined that the signal for closing the shutter 120 is generated in operation S409, the controller 150 closes the shutter 120.

In operation S411, after closing the shutter 120, the controller 150 transits the image pickup system to the operating mode. For example, power is supplied to the circuit configuration means that are inactivated in the second standby mode to activate them. For example, circuits responsible for modes other than the long duration exposure mode (e.g., other-mode circuits) and signal processing circuits responsible for processing image data of the image sensor (e.g., signal processor 140 or A/D converter 220) may both be activated. Alternately, only the signal processing circuits may be activated.

In operation S412, after transiting the image pickup system to the operating mode, the signal processor 140 processes a signal output generated by the image sensor 130 according to the specifications set on the image pickup system, and then in operation S413, the controller 150 stores the processed signal in the memory 170. In operation S414, the controller 150 transits the image pickup system to the first standby mode. The first and second standby modes may be an identical power saving state. Alternatively, the first and second standby modes may be different.

While the present invention has been particularly shown and described with reference to exemplary embodiments thereof, it will be understood that various changes in form and details may be made therein without departing from the spirit and scope of the present disclosure.

What is claimed is:

1. An image pickup system comprising:
an image sensor that detects an optical signal incident on the image sensor and converts the optical signal to an electric signal;
a signal processor that generates image data by processing the electric signal output from the image sensor;
a switch unit comprising a key to select a long duration exposure mode to perform a long duration exposure; and
a controller that switches the signal processor to a standby mode in response to receipt of a key input signal, when the key is selected.

2. The image pickup system of claim 1, wherein when the signal processor is switched to the standby mode, power supplied to the signal processor is blocked.

3. The image pickup system of claim 1, wherein when the long duration exposure is performed, the controller is configured to further block power supplied to at least one circuit unit included in the image sensor.

4. The image pickup system of claim 1, wherein when the long duration exposure is performed, the controller is configured to further block current flowing through a column signal line connected to an output terminal of a pixel array included in the image sensor.

5. The image pickup system of claim 1, wherein when the long duration exposure has completed, the controller is configured to further switch the signal processor from the standby mode to an operating mode.

6. The image pickup system of claim 1, wherein when the shutter is open in the long duration exposure, the controller is configured to switch the signal processor from an operating mode to the standby mode.

7. The image pickup system of claim 1, wherein before switching the signal processor to the standby mode according to the long the duration exposure, the controller is configured to store information about specifications of the image pickup system in a storage unit.

8. The image pickup system of claim 1, further comprising:
a memory that stores image data generated by the signal processor;
a shutter that allows light to pass through or block from the image sensor; and
a shutter driving unit that opens or closes the shutter under the control of the controller.

9. The image pickup system of claim 1, wherein the switch unit sends the key input signal for opening a shutter to the controller when the key is selected.

10. The image pickup system of 1, wherein the key is a physical key and the key is selected by pressing the key.

11. A method of operating an image pickup system comprising a shutter, an image sensor, and a signal processor, the method comprising:
switching the signal processor from an operating mode to a standby mode in response to receipt of a key input signal when a key of a switch unit of the system is selected to select a long duration exposure mode to perform a long duration exposure; and
switching the signal processor from the standby mode to an operating mode when the long duration exposure has completed.

12. The method of claim 11, wherein the signal processor is switched from the operating mode to the standby mode when the key is selected and when the shutter is open in the long duration exposure.

13. The method of claim 11, wherein when the shutter is converted from an open state to a closed state in the long duration exposure mode, the long duration exposure has completed.

14. The method of claim 11, further comprising:
blocking power supplied to at least one circuit unit included in the image sensor in the long duration exposure.

15. The method of claim 14, wherein the blocking of the power supplied to at least one circuit unit included in the image sensor comprises:
blocking current flowing through a column signal line connected to an output terminal of a pixel array included in the image sensor.

16. The method of claim 11, further comprising the switch unit sending the key input signal for opening the shutter to a controller of the system when the key is selected.

17. An image pickup system comprising:
an image sensor that detects an optical signal incident on the image sensor and converts the optical signal to an electric signal;
a signal processor that generates image data by processing the electric signal output from the image sensor; and
a controller that switches the signal processor to a standby mode, when a long duration exposure is performed,
wherein before switching the signal processor to the standby mode according to the long the duration exposure, the controller is configured to store a resolution specification of the image pickup system in a storage unit.

18. An image pickup system comprising:
an image sensor that detects an optical signal incident on the image sensor and converts the optical signal to an electric signal;
a signal processor that generates image data by processing the electric signal output from the image sensor; and
a controller that switches the signal processor to a standby mode, when a long duration exposure is performed,
wherein when the long duration exposure is performed, the controller is configured to further block current flowing through a column signal line connected to an output terminal of a pixel array included in the image sensor.

19. A method of operating an image pickup system comprising a shutter, an image sensor, and a signal processor, the method comprising:
switching the signal processor from an operating mode to a standby mode when a long duration exposure is performed; and
blocking current flowing through a column signal line connected to an output terminal of a pixel array included in the image sensor in the long duration exposure; and
switching the signal processor from the standby mode to an operating mode when the long duration exposure has completed.

20. An image pickup system comprising:
an image sensor that detects an optical signal incident on the image sensor and converts the optical signal to an electrical signal;
a signal processor that generates image data by processing the electric signal output from the image sensor;
a switch unit comprising a key to select a long duration exposure mode to perform a long duration exposure;
a controller that switches the signal processor to a standby mode, when the key is selected,
wherein the controller is configured to maintain first firmware for analyzing a signal received from the switch unit and second firmware for controlling the standby mode in an operating mode such that the first and second firmware are activated and all remaining firmware of the controller is deactivated, when the long duration exposure is performed.

\* \* \* \* \*